United States Patent [19]
Kidokoro et al.

[11] Patent Number: 5,746,185
[45] Date of Patent: May 5, 1998

[54] FUEL STORING DEVICE FOR AN AUTOMOBILE

[75] Inventors: Toru Kidokoro, Hadano; Takaaki Ito, Mishima; Yoshihiko Hyodo, Susono, all of Japan

[73] Assignee: Toyota Jidosha Kabushiki Kaisha, Aichi, Japan

[21] Appl. No.: 751,801

[22] Filed: Nov. 19, 1996

[30] Foreign Application Priority Data

Nov. 20, 1995 [JP] Japan ................... 7-301534

[51] Int. Cl.$^6$ ................ F02M 37/04; F02M 25/08
[52] U.S. Cl. ....................... 123/516; 123/518
[58] Field of Search ..................... 123/516, 518, 123/519; 220/4.14, 905

[56] References Cited

U.S. PATENT DOCUMENTS

| | | |
|---|---|---|
| 3,409,714 | 11/1968 | Strugar . |
| 3,617,034 | 11/1971 | Skinner . |
| 3,701,540 | 10/1972 | Pringle . |
| 3,949,720 | 4/1976 | Zipprich et al. . |
| 3,977,379 | 8/1976 | Weissenbach . |
| 5,056,493 | 10/1991 | Holzer . |
| 5,460,135 | 10/1995 | Ohashi et al. . |
| 5,596,971 | 1/1997 | Kidokoro ............... 123/518 |

FOREIGN PATENT DOCUMENTS

| | | |
|---|---|---|
| 60-157427 | 10/1985 | Japan . |
| 60-158922 | 10/1985 | Japan . |
| 62-158923 | 10/1985 | Japan . |
| 64-16426 | 1/1989 | Japan . |
| 7-132738 | 5/1995 | Japan . |

OTHER PUBLICATIONS

Copending U.S. Patent application Ser. No. 545,066, filed Oct. 19, 1995.

*Primary Examiner*—Thomas N. Moulis
*Attorney, Agent, or Firm*—Kenyon & Kenyon

[57] ABSTRACT

A fuel storing device for an automobile, having a flexible separator means disposed in a fuel storage container for separating the inside of the fuel storage container into a fuel storage portion and a space portion, comprises a fuel suction pipe inlet opening keeping means for keeping the opening for withdrawing fuel open in said fuel storage portion.

The fuel suction pipe inlet opening keeping means prevents the inlet opening of the fuel suction pipe from being covered, and thereby all of the fuel can be sucked while any fuel is left in the device.

7 Claims, 5 Drawing Sheets

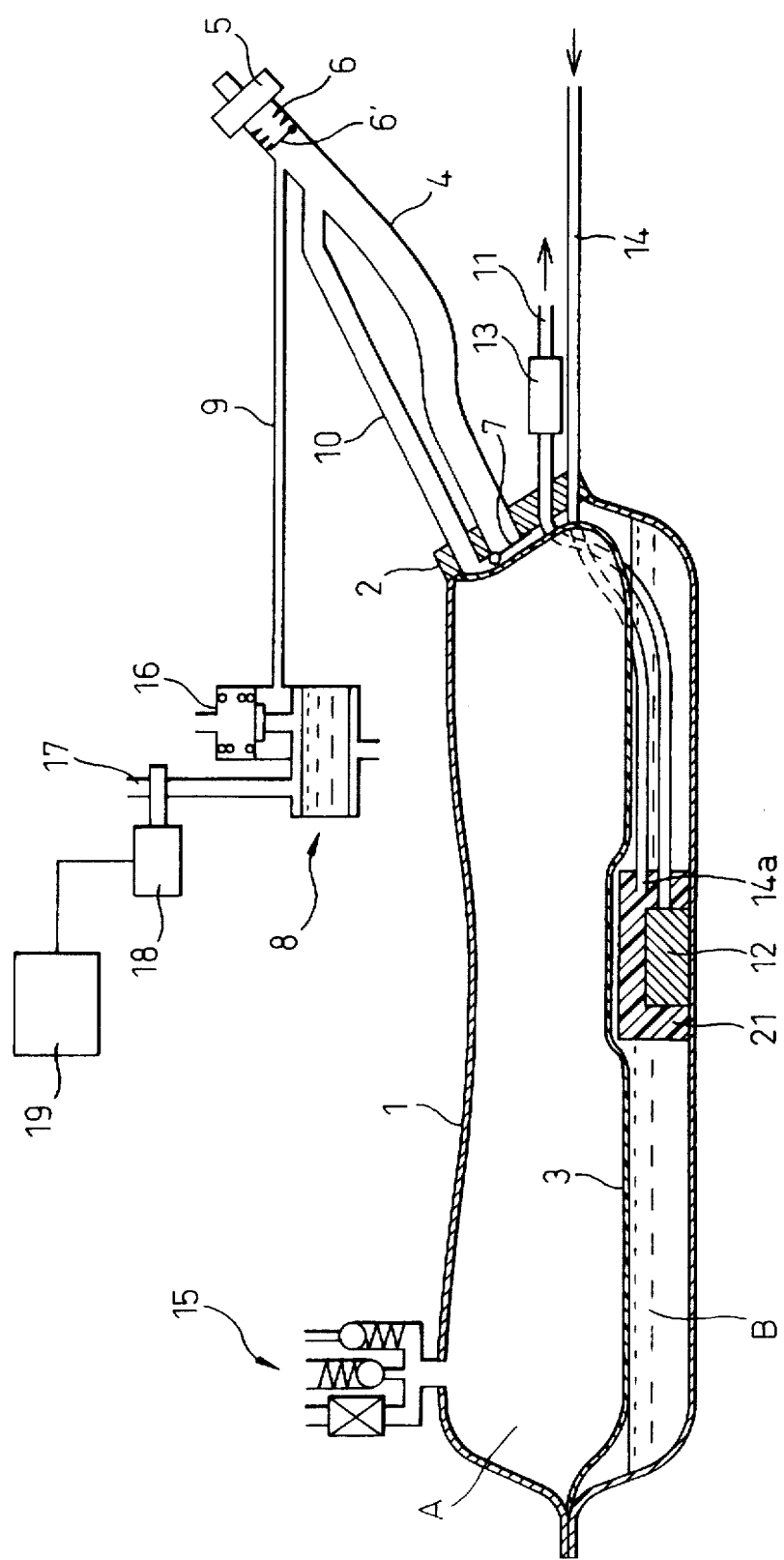

FUEL STORING DEVICE FOR AN AUTOMOBILE

BACKGROUND OF THE INVENTION

1. Field of the Invention

The present invention relates to a fuel storage device for an automobile having a flexible separator means which moves up and down in accordance with the movement of the surface of liquid fuel stored therein to suppress an accumulation of fuel vapor above the surface of liquid fuel.

2. Description of the Related Art

Recently, many automobiles have been equipped with canisters to adsorb fuel vapor generated in a fuel storing device. The fuel adsorbed in the canister is introduced into a combustion chamber to be burned with fuel injected by fuel injectors. Automobiles having such canister can prevent fuel vapor from being dispersed into the atmosphere during driving or parking.

However, the above described system is insufficient for future stricter evaporative gas emission regulations which limit the amount of evaporative gas which may be dispersed into the atmosphere during refueling. This is because the amount of fuel vapor generated at refueling is remarkably larger than in other conditions for a conventional rigid type fuel storage device.

If refueling is carried out through a refuel pipe when a large amount of fuel vapor is stored in a fuel storing device, the fuel vapor is pushed out by the fuel. The volume of the fuel vapor is large when volume when the volume of space above the surface of liquid fuel is large. Therefore a conventional type fuel storage device which has storage capacity and a constant volume cannot avoid an increase in the amount of fuel vapor when the amount of liquid fuel decreases. Several tens of liters of fuel vapor must be absorbed when an empty fuel storage device is refueled. However, it is impossible to dispose a canister having a capacity to adsorb such a large volume fuel vapor in an automobile.

Therefore, it is required to decrease the amount of fuel vapor maintained in the fuel storage device. Many kinds of fuel storage devices which do not allow space for fuel vapor above the surface of liquid fuel when the amount of fuel in the fuel storage device becomes small have been developed. For example, a fuel storage device which has a separator film which moves up and down in accordance with the surface of liquid fuel therein is disclosed (see Japanese Unexamined Utility Model Publication (Kokai) No. 158992).

According to the above described type fuel storage device, the gathering of fuel vapor above the surface of liquid fuel is suppressed. However, in the above described type fuel storage device, there is a risk of the film covering the opening of the fuel suction pipe and thereby stopping the fuel supply when the fuel storage device is almost empty and, due to an acceleration of the vehicle, the fuel moves to one corner of the fuel storage device, and the film approaches the bottom of the fuel storage device.

SUMMARY OF THE INVENTION

An object of the present invention is to provide a fuel storage device having flexible separator means which cannot cover the opening of the fuel suction pipe and restrict the supply of the fuel.

According to the present invention, there is provided a fuel storing device for an automobile comprising, a fuel storage container, a flexible separator means disposed in the fuel storage container for separating the inside of the fuel storage container into a fuel storage portion and a space portion and being movable up and down in accordance with movement of the surface of liquid fuel in the fuel storage portion, a refuel pipe connected to the fuel storage portion, a fuel suction pipe having an inlet opening for withdrawing fuel in the fuel storage portion, and a fuel suction pipe inlet opening keeping means for keeping the flexible separator means apart from the inlet opening of the fuel suction pipe when the flexible separator means comes close to the bottom of the fuel storage container in accordance with a decrease in the level of fuel in the fuel storage portion.

The present invention may be more fully understood from the description of the preferred embodiments of the invention set forth below, together with the accompanying drawings.

BRIEF DESCRIPTION OF THE DRAWINGS

In the drawings;

FIG. 5 is a general view of the third embodiment of the present invention.

DESCRIPTION OF THE INVENTION

Figure 1:
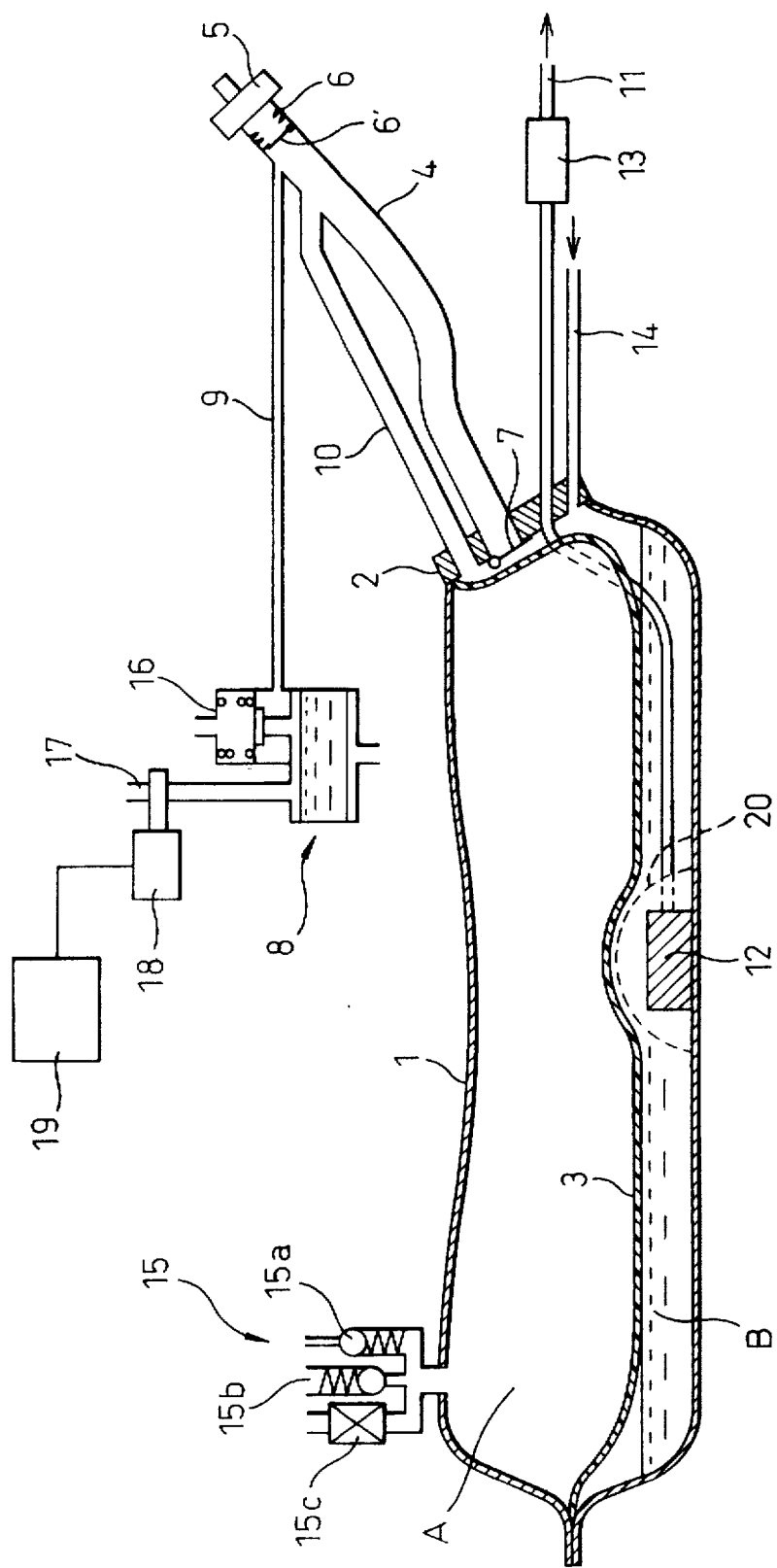
FIG. 1 is a general view of the first embodiment of the present invention.

FIG. 1 shows the construction of a first embodiment of the present invention. Referring to FIG. 1, reference numeral 1 is a tank shell made of high rigidity material such as metal or synthetic resin. A flange portion 2 is formed at one side of the tank shell 1.

A separator film 3 made of flexible material, such as nylon resin for example, is connected to the tank shell 1. The separator film 3 separates the inside of the tank shell into a space portion "A" and a fuel storing portion "B".

Reference numeral 4 is a refuel pipe, one end of which extends to a portion near the outer wall of automobile body (not shown). A fuel filler cap 5 is detachably fitted to the end of the refuel pipe 4. A nozzle seal 6 disposed near the fuel filler cap 5 prevents fuel vapor from being dispersed from a portion around a fuel supply gun (not shown) to the ambient air at refueling. A puff-loss stopper valve 6' prevents fuel vapor existing in refuel pipe 4 before refueling from being dispersed when the fuel filler cap 5 is opened.

On the other hand, a reverse flow stopper valve 7 is disposed at the inner end of the refuel pipe 4. The reverse flow stopper valve 7 prevents fuel from flowing back to the refuel pipe 4. A vapor draining passage 9 extending to a canister 8 is attached to the refuel pipe 4 at a portion lower than the nozzle seal 6. A subpipe 10 is disposed to introduce a fuel vapor gathered under the separator film 3 into a refuel pipe 4 at a portion where the vapor draining passage 9 is attached.

Reference numeral 11 is a fuel suction pipe. On one end of the fuel suction pipe 11, a fuel filter 12 is attached and extends to the bottom of the tank shell 1, and the other end of the fuel suction pipe extends to the fuel injector of the engine (not shown) through a fuel pump 13 which is interposed therebetween.

Reference numeral 14 is a fuel return pipe. One end of the fuel return pipe 14 is connected to the fuel suction pipe 11 at a portion near the fuel injector, and the other end of the fuel return pipe 14 is extended into the fuel storing portion "B".

Reference numeral 15 is a pressure regulator to regulate a pressure in space "A" so that the separator film 3 contacts the surface of the liquid fuel. The pressure regulator 15 is composed of a first regulator valve 15a, a second regulator valve 15b, and a third regulator valve 15c. The first regulator valve 15a opens when the pressure in the space "A" becomes lower than the atmospheric pressure. The second regulator valve 15b opens when the pressure in the space "A" becomes higher than a predetermined pressure which is higher than the atmospheric pressure to prevent the fuel in the fuel storing portion "B" from being too highly pressurized. The third regulator valve 15c is opened when the fuel tank lid of the automobile body (not shown) is opened so that the pressure in the space "A" is kept to be the same as the atmospheric pressure and refueling can be smoothly carried out.

Reference numeral 16 is a pressure regulator valve which open when the pressure of the fuel storing portion "B" exceeds a predetermined value to keep the pressure constant.

The fuel vapor over the surface of the liquid fuel is introduced to the upper part of the refuel pipe 4 through the subpipe 10, and from there further introduced to the canister 8 through the vapor draining passage 9. Thus, fuel vapor is prevented from accumulating over the surface of liquid fuel.

The fuel vapor introduced to the canister 8 is temporarily adsorbed by an adsorber made of activated carbon, for example. The fuel adsorbed by the adsorber is introduced into the intake passage of the engine (not shown) through a purge line 17 at predetermined operating condition of the engine and then transferred to the combustion chamber, with the fuel injected by the fuel injector and the intake air, to be burned. The purge line 17 is opened and closed by a purge control valve 18 which is controlled by an electronic control unit 19 based upon from signals from various sensors. The detail of construction and operation of the electric control unit 19 is not described, since the characteristic feature of the present invention does not exist therein and many known control methods can be applied.

A mesh cover 20 is disposed to surround the fuel filter 12 which is attached to the end of the fuel suction pipe 11. The mesh cover 20 does not prevent the fuel from being sucked through the fuel filter 12 and the inlet opening of the fuel suction pipe 11. The mesh cover 20 prevents the fuel filter 12 from being covered by the separator film 3, when fuel momentarily moves from the area around the fuel filter 12 due to acceleration of the automobile when a small volume of fuel is stored in the fuel storage device. Therefore, suction of the fuel continues while some fuel is left in the device.

Figure 2:
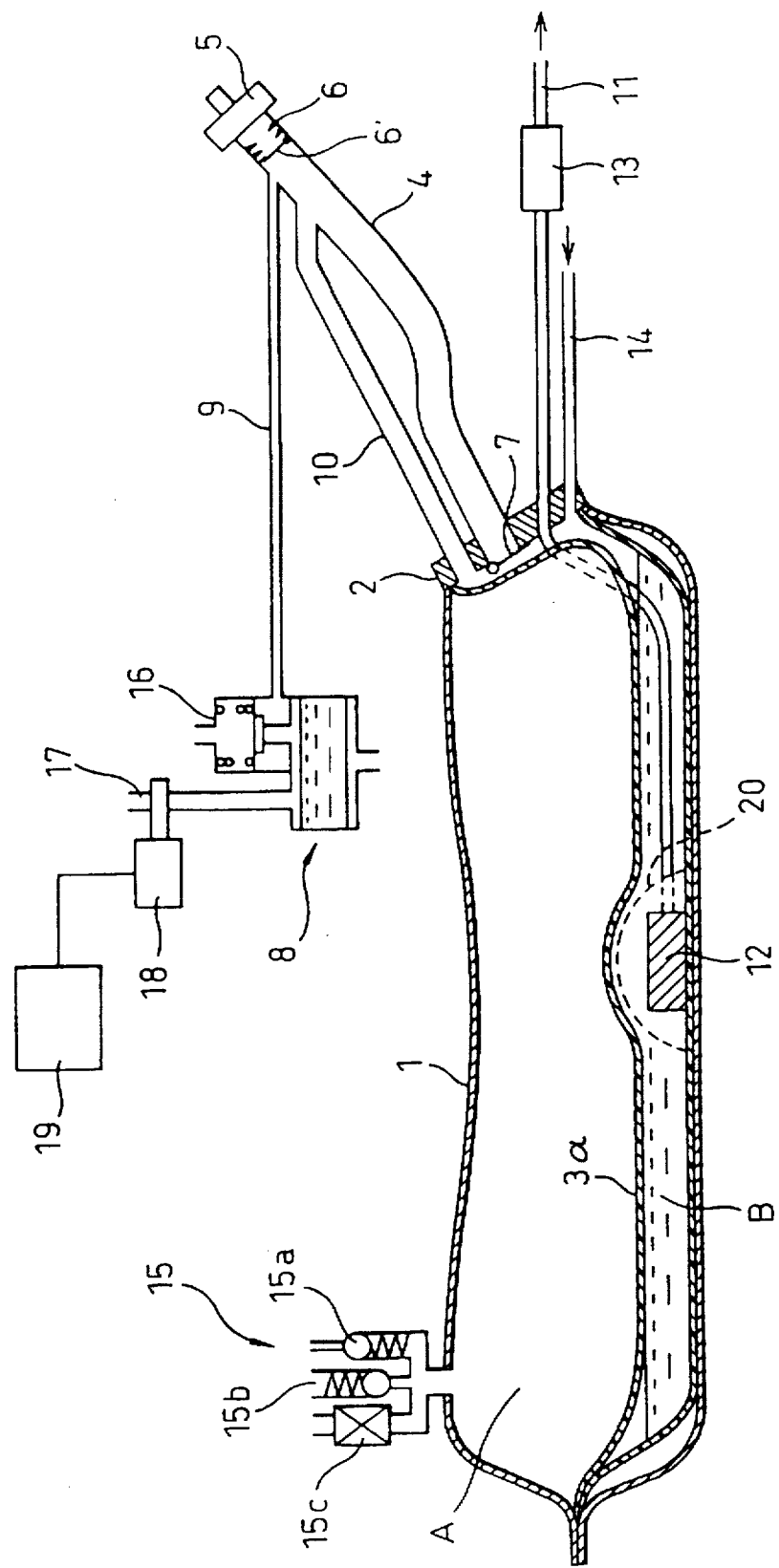
FIG. 2 is a general view of a first variation of the first embodiment.

FIG. 2 shows the construction of a first variation of the first embodiment of the present invention.

Instead of the separator film 3 of the first embodiment, a bag-shaped flexible fuel storage member 3a made of flexible material is connected to the inner portion of the flange portion 2 of the tank shell 1. Therefore, fuel is stored in the bag-shaped flexible fuel storage member 3a. The bottom part of the flexible fuel storage member 3a has greater thickness than other parts for preventing this part from wearing by rubbing against the tank shell 1. However, it is also possible to fix the bottom of the flexible fuel storage member 3a to the inner surface of a bottom of the tank shell 1 using adhesive, for example.

To obtain a good sealing ability in this variation the tank shell 1, the refuel pipe 4, the subpipe 10, the fuel suction pipe 11 and the fuel return pipe 14 are not directly attached to the flexible fuel storage member 3a, but attached to the flange 2 to which the bag-shaped flexible fuel storage member 3a is attached.

Figure 3:
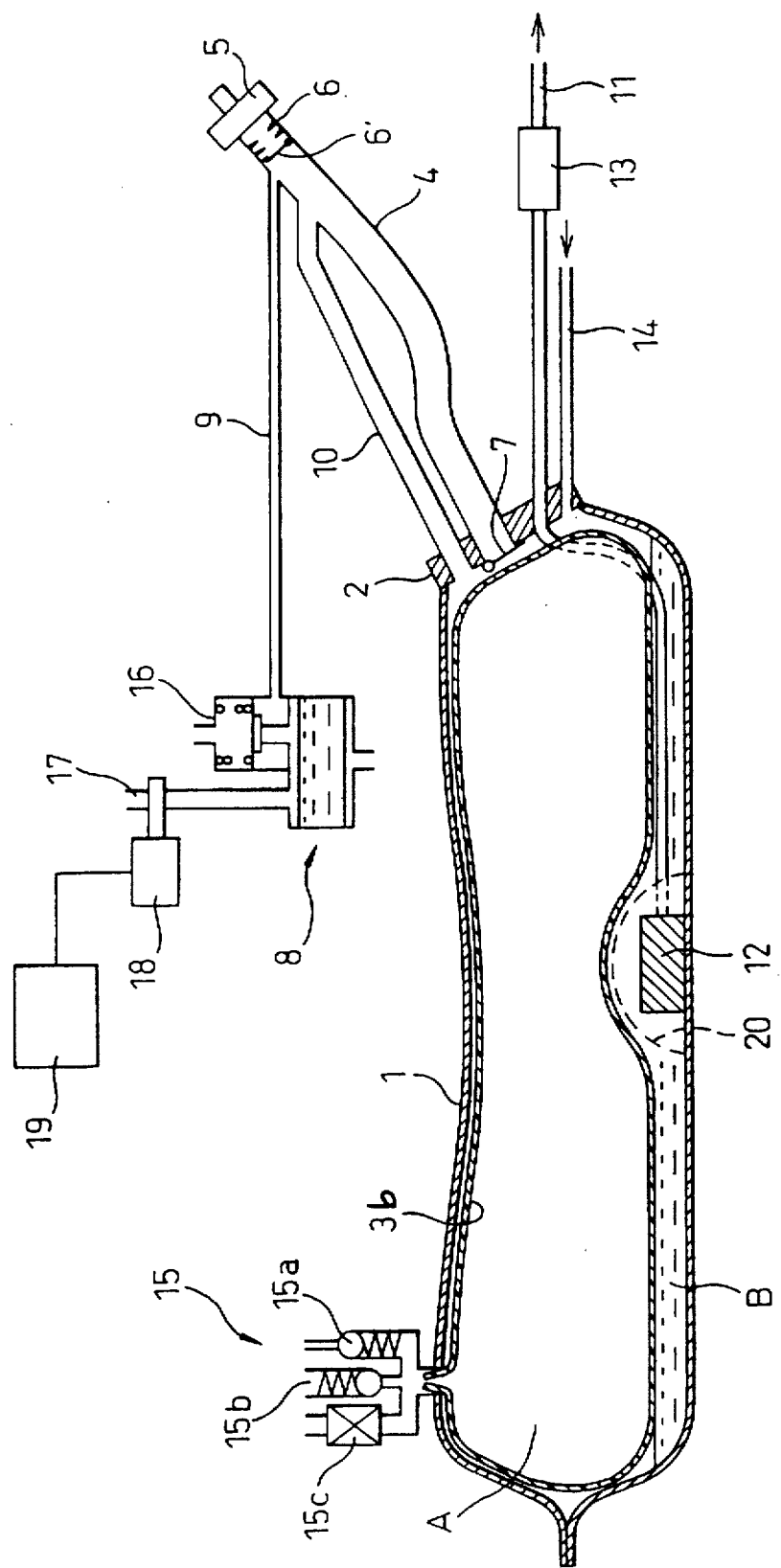
FIG. 3 is a general view of a second variation of the first embodiment.

FIG. 3 shows a second variation of the first embodiment. In this second variation of the first embodiment, the space between the surface of liquid fuel and the tank shell 1 is covered by a bag-shaped flexible air storing member 3b, while the fuel is covered by a bag-shaped flexible fuel storing member 3 in the first variation. The pressure regulator 15 is, accordingly, connected to the flexible air storing member 3b.

Figure 4:
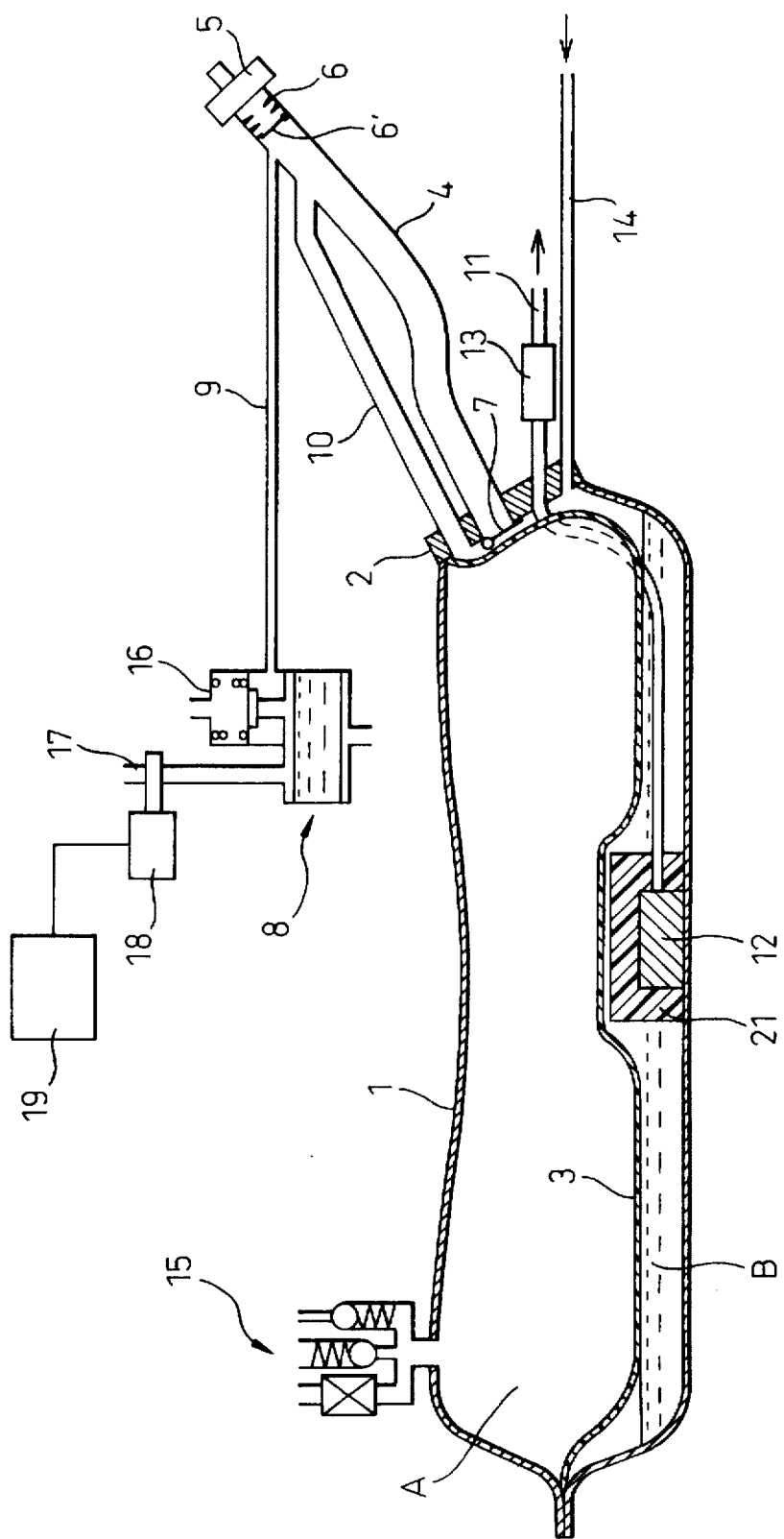
FIG. 4 is a general view of the second embodiment of the present invention.

FIG. 4 shows a second embodiment of the present invention. In this second embodiment, a fuel imbibing member 21 made of hard porous material, is disposed to surround the fuel filter 12 instead of the mesh cover 20 used in the first embodiment and its variations. By being thus constructed, in the second embodiment, the fuel can be stored in the imbibing member 21 even when the volume of the fuel approaches zero. Therefore, in low-fuel condition, some fuel exists around the fuel filter 12 even during acceleration of the automobile. Accordingly, all the fuel can be sucked without interruption. The above described construction may also be combined with either of the first and second variations of the first embodiment.

The fuel imbibing member 21 can be made of any material having ability to imbibing the fuel.

FIG. 5 shows a third embodiment of the present invention. In this third embodiment, in addition to the second embodiment, the fuel return pipe 14 is extended so that its outlet opening 14a is located in the fuel imbibing member 21. By being thus constructed, in this third embodiment the returned fuel is not spread in the fuel storing portion but imbibed by the imbibing member 21. Therefore, the fuel imbibing member 21 can more surely imbibe any available fuel when the volume of the fuel approaches zero. Further, the fuel in the tank shell 1 is less disturbed by the returned fuel and thereby the fuel vapor pressure is not increased. This is because the returned fuel which is heated during passing through a passage located near the engine and accordingly includes vapor is not spread to the fuel which exist in the fuel storing portion.

As described above, according to the present invention, all available fuel can be sucked, at a constant rate, in the fuel storage device for an automobile having a flexible separator means for separating the inside of the fuel storage container into a fuel storage portion and a space portion.

We claim:

1. A fuel storing device for an automobile comprising:

a fuel storage container;

a flexible separator means disposed in the fuel storage container for separating the inside of the fuel storage container into a fuel storage portion and a space portion, the flexible separator means being moveable up and down in accordance with the movement of a surface of liquid fuel in the fuel storage portion;

a refuel pipe connected to the fuel storage portion;

a fuel suction pipe having an inlet opening into the fuel storage portion for withdrawing fuel in the fuel storage portion; and a fuel imbibing member made of porous material for maintaining a separation between the flexible separator means and the inlet when the flexible separator comes close to the bottom of fuel storage container in accordance with a decrease in a level of fuel in the fuel storage portion.

2. A fuel storing device according to claim 1, further comprising a fuel return pipe for returning excessive fuel for injection into said fuel storage portion, wherein the outlet opening of the fuel return pipe is disposed in said fuel imbibing member.

3. A fuel storing device for an automobile comprising:

a fuel storage container;

a flexible separator disposed in the fuel storage container for separating the inside of the fuel storage container into a fuel storage portion and a space portion, the flexible separator being moveable up and down in accordance with the movement of a surface of liquid fuel in the fuel storage portion;

a refuel pipe connected to the fuel storage portion;

a fuel suction pipe having an inlet opening into the fuel storage portion for withdrawing fuel in the fuel storage portion; and a fuel imbibing means disposed proximate to the inlet for temporarily imbibing fuel.

4. A fuel storing device according to claim 3, wherein the fuel imbibing means is made of porous material.

5. A fuel storing device according to claim 3, further comprising a fuel return pipe for returning excess fuel from a fuel injection system to the fuel storage portion, wherein an outlet from the fuel return pipe is disposed within the fuel imbibing means.

6. A fuel storing device according to claim 3, wherein the flexible separator is formed as a bag to surround one of the fuel storage portion and the space portion.

7. A fuel storing device according to claim 1, wherein the flexible separator is formed as a bag to surround one of the fuel storage portion and the space portion.

\* \* \* \* \*

UNITED STATES PATENT AND TRADEMARK OFFICE
CERTIFICATE OF CORRECTION

PATENT NO. : 5,746,185
DATED : May 5, 1998
INVENTOR(S) : Toru KIDOKORO, et al.

It is certified that error appears in the above-indentified patent and that said Letters Patent is hereby corrected as shown below:

Column 1, line 17, change "canister" to --canisters--.

Column 3, line 23, change "open" to --opens--.

Column 3, line 34, before "predetermined" insert --a--.

Column 3, line 39, delete "from" after "upon".

Column 4, line 31, change "imbibing" to --imbibe--.

Column 4, line 47, change "exist" to --exists--.

Column 5, line 4, before "fuel" insert --the--.

Signed and Sealed this

Fourth Day of April, 2000

Attest:

Attesting Officer

Q. TODD DICKINSON

Director of Patents and Trademarks